United States Patent
Goronzy et al.

(10) Patent No.: US 6,799,162 B1
(45) Date of Patent: Sep. 28, 2004

(54) SEMI-SUPERVISED SPEAKER ADAPTATION

(75) Inventors: Silke Goronzy, Fellbach-Schmiden (DE); Ralf Kompe, Fellbach (DE); Peter Buchner, Kirchheim/Teck (DE); Naoto Iwahashi, Kanagawa (JP)

(73) Assignees: Sony Corporation, Tokyo (JP); Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/461,981

(22) Filed: Dec. 15, 1999

(30) Foreign Application Priority Data

Dec. 17, 1998 (EP) .......................................... 98124024

(51) Int. Cl.[7] .............................................. G10L 15/06
(52) U.S. Cl. ..................................................... 704/244
(58) Field of Search ............................... 704/244, 243, 704/245

(56) References Cited

U.S. PATENT DOCUMENTS

| | | | | |
|---|---|---|---|---|
| 4,618,984 A | * | 10/1986 | Das et al. ..................... | 704/244 |
| 5,040,213 A | * | 8/1991 | Yasuda et al. .............. | 704/244 |
| 5,046,099 A | * | 9/1991 | Nishimura ................... | 704/256 |
| 5,127,055 A | * | 6/1992 | Larkey ........................ | 704/244 |
| 5,144,672 A | | 9/1992 | Kuriki ......................... | 704/252 |
| 5,586,171 A | * | 12/1996 | McAllister et al. ....... | 379/88.02 |
| 5,842,168 A | | 11/1998 | Miyazawa et al. .......... | 704/275 |
| 5,920,837 A | * | 7/1999 | Gould et al. ................ | 704/251 |
| 5,970,239 A | * | 10/1999 | Bahl et al. ................... | 704/245 |
| 6,260,013 B1 | * | 7/2001 | Sejnoha ....................... | 704/240 |

FOREIGN PATENT DOCUMENTS

| | | | | |
|---|---|---|---|---|
| EP | 0 660 304 A2 | 6/1995 | ................. | 704/243 |
| EP | 0 763 816 A2 | 3/1997 | ................. | 704/256 |
| EP | A 773 532 A2 | 5/1997 | ................. | 704/231 |

OTHER PUBLICATIONS

Shigeru Homma, Kiyoaki Aikawa, and Shigeki Sagayama, "Improved Estimation of Supervision in Unsupervised Speaker Adaptation," 1997 IEEE Int. Conf on Acoustics, Speech and Signal Processing, 1997. ICASSP–97, Apr. 21–24, 1997, pp. 1023–1026.*
Homma S et al.: "Iterative Unsupervised Speaker Adaptation for Batch Dictation", Proceeding of Fourth International Conference on Spoken Language Processing, vol. 2, No. 96TH8206, Oct. 3–6, 1996, pp. 1141–1144, XP002100688.
Zeppenfeld T et al.: "Recognition of Conversational Telephone Speech Using the Janus Speech Engine", IEEE International Conference on Acoustics, Speech, and Signal Processing, vol. 3, Apr. 21–24, 1997, pp. 1815–1818, XP002100689.

* cited by examiner

Primary Examiner—Richemond Dorvil
Assistant Examiner—Donald L. Storm
(74) Attorney, Agent, or Firm—Frommer Lawrence & Haug LLP; William S. Frommer; Hans R. Mahr (57) ABSTRACT

To prevent adaptation to misrecognized words in unsupervised or on-line automatic speech recognition systems confidence measures are used or the user reaction is interpreted to decide whether a recognized phoneme, several phonemes, a word, several words or a whole utterance should be used for adaptation of the speaker independent model set to a speaker adapted model set or not and, in case an adaptation is executed, how strong the adaptation with this recognized utterance or part of this recognized utterance should be performed. Furtheron, a verification of the speaker adaptation performance is proposed to secure that the recognition rate never decreases (significantly), but only increases or stays at the same level.

30 Claims, 5 Drawing Sheets

SEMI-SUPERVISED SPEAKER ADAPTATION

This invention is related to automatic speech recognition (ASR), in particular to methods to perform an unsupervised or on-line adaption of an automatic speech recognition system and to a speech recognition system being able to carry out the inventive methods.

State of the art speech recognizers consist of a set of statistical distribustions modeling the acoustic properties of certain speech segments. These acoustic properties are encoded in feature vectors. As an example, one Gaussian distribution can be taken for each phoneme. These distributions are attached to states. A (stochastic) state transition network (usually Hidden Markov Models) defines the probabilities for sequences of states and sequences of feature vectors. Passing a state consumes one feature vector covering a frame of e.g. 10 ms of the speech signal.

The stochastic parameters of such a recognizer are trained using a large amount of speech data either from a single speaker yielding a speaker dependent (SD) system or from many speakers yielding a speaker independent (SI) system.

Speaker adaptation (SA) is a widely used method to increase recognition rates of SI systems. State of the art speaker dependent systems yield much higher recognition rates than speaker independent systems. However, for many applications, it is not feasible to gather enough data from a single speaker to train the system. In case of a consumer device this might even not be wanted. To overcome this mismatch in recognition rates, speaker adaptation algorithms are widely used in order to achieve recognition rates that come close to speaker dependent systems, but only use a fraction of speaker dependent data compared to speaker dependent systems. These systems initially take speaker independent models that are then adapted so as to better match the speakers acoustics.

Usually, the adaptation is performed supervised. That is, words spoken are known and the recognizer is forced to recognize them. Herewith a time alignment of the segment-specific distributions is achieved. The mismatch between the actual feature vectors and the parameters of the corresponding distribution builds the basis for the adaptation. The supervised adaptation requires an adaptation session to be done with every new speaker before he/she can actually use the recognizer.

Figure 5:
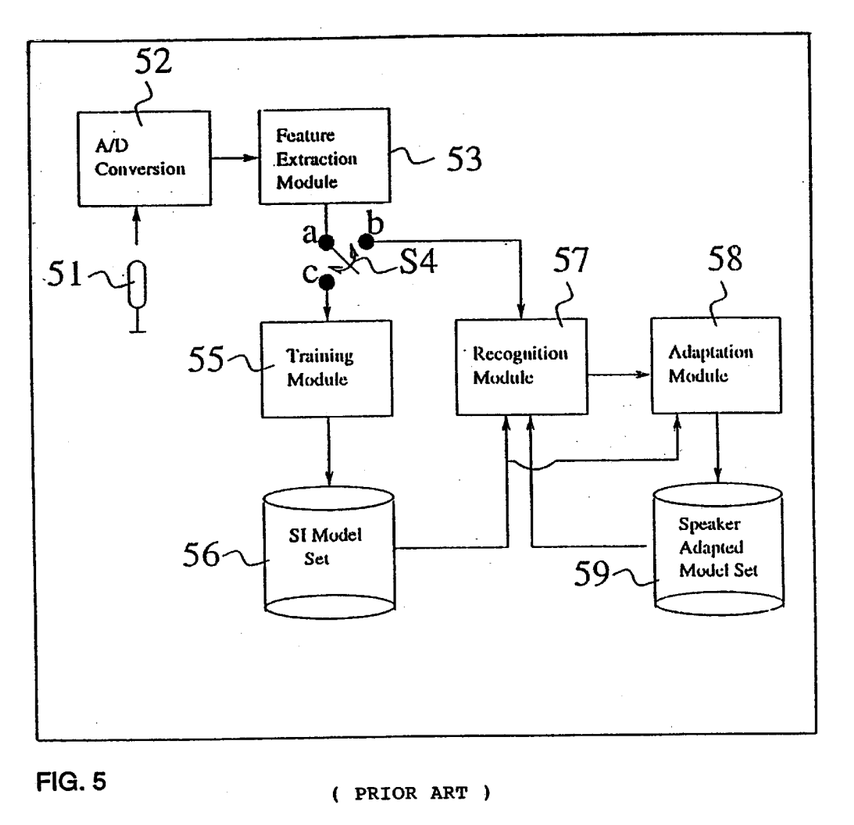
FIG. 5 shows an exemplary speech recognition system according to the prior art.

FIG. 5 shows a block diagram of such an exemplary speech recognition system according to the prior art. The spoken utterances received with a microphone 51 are converted into a digital signal in an A/D conversion stage 52 that is connected to a feature extraction module 53 in which a feature extraction is performed to obtain a feature vector e.g. every 10 ms. Such a feature vector is either used for training of a speech recognition system or after training it is used for adaptation of the initially speaker independent models and during use of the recognizer for the recognition of spoken utterances.

For training, the feature extraction module 53 is connected to a training module 55 via the contacts a and c of a switch 54. The training module 55 of the exemplary speech recognition system working with Hidden Markov Models (HMMs) obtains a set of speaker independent (SI) HMMs. This is usually performed by the manufacturer of the automatic speech recognition device using a large data base comprising many different speakers.

After the speech recognition system loads a set of SI models, the contacts a and b of the switch 54 are connected so that the feature vectors extracted by the feature extraction module 53 are fed into a recognition module 57 so that the system can be used by the customer and adapted to him/her. The recognition module 57 then calculates a recognition result based on the extracted feature vectors and the speaker independent model set. During the adaptation to an individual speaker the recognition module 57 is connected to an adaptation module 58 that calculates a speaker adapted model set to be stored in a storage 59. In the future, the recognition module 57 calculates the recognition result based on the extracted feature vector and the speaker adapted model set. A further adaptation of the speaker adapted model set can be repeatedly performed to further improve the performance of the system for specific speakers. There are several existing methods for speaker adaptation, such as maximum a posteriori adaptation (MAP) or maximum likelihood linear regression (MLLR) adaptation.

Usually, the speaker adaptation techniques modify the parameters of the Hidden Markov Models so that they better match the new speakers acoustics. As stated above, normally this is done in batch or off-line adaptation. This means that a speaker has to read a pre-defined text before he/she can use the system for recognition, which is then processed to do the adaptation. Once this is finished the system can be used for recognition. This mode is also called supervised adaptation, since the text was known to the system and a forced alignment of the corresponding speech signal to the models corresponding to the text is performed and used for adaptation.

However, an unsupervised or on-line method is better suited for most kinds of consumer devices. In this case, adaptation takes place while the system is in use. The recognized utterance is used for adaptation and the modified models are used for recognizing the next utterance and so on. In this case the spoken text is not known to the system, but the word(s) that were recognized are taken instead.

The EP 0 763 816 A2 proposes to use confidence measures as an optimization criterium for HMM training. These confidence measures are additional knowledge sources used for the classification of a recognition result as "probably correct" or "probably incorrect". Here, confidence measures are used for verification of n best recognized word strings and the result of this verification procedure, i.e. the derivative of the loss function, is used as optimization criterium for the training of the models. In this case, all utterances are used for training and the method is used to maximize the difference in the likelihood of confusable words. However, this document relates only to HMM training prior to system use.

On the other hand, the EP 0 793 532 A2 discloses a method to correct misrecognition by uttering a predefined keyword "oops" whereafter the user might correct the misrecognized words by typing or the system tries to correct the error itself. In any case, the system only trains/adapts the speech models when a (series of) word(s) has been misrecognized.

The present invention is concerned with the adaptation of speaker independent Hidden Markov Models in speech recognition systems using unsupervised or on-line adaptation. In these systems the HMMs have to be steadily refined after each new utterance or even after parts of utterances. Furtheron, the words that come into the system are not repeated several times and are not known to the system. Therefore, only an incremental speaker adaptation is possible, i.e. only very little adaptation data is available at a time, and additionally the problem arises that misrecognitions occur depending on the performance of the speaker independent system, because the output of the recognition module has to be assumed to be the correct word. These words are then used for adaptation and if the word was misrecognized, the adaptation algorithm will modify the models in a wrong way. The recognition performance might decrease drastically when this happens repeatedly.

Therefore, it is the object underlying the present invention to propose a method and a device for unsupervised adaptation that overcome the problems described above in connection with the prior art.

The inventive methods are defined in independent claims 1 and 17 and the inventive device is defined in independent claim 23. Preferred embodiments thereof are respectively defined in the following dependent claims.

According to the invention, a kind of measurement indicates how reliable the recognition result was. The adaptation of the system is then based on the grade of the reliability of said recognition result. Therefore, this method according to the present invention is called semi-supervised speaker adaptation, since no supervising user or fixed set of vocabulary for adaptation is necessary.

In case of a reliable recognition an utterance can be used for adaptation to a particular speaker, but in case of an unreliable recognition the utterance is discarded to avoid a wrong modification of the models. Alternatively, depending on the grade of the reliability a weight can be calculated that determines the strength of the adaptation.

Figure 2:
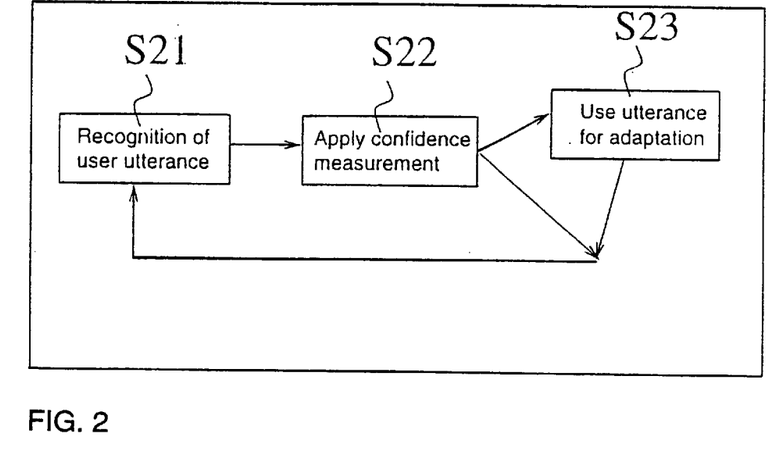
FIG. 2 shows a first adaptation method according to the present invention in which confidence measures are used.

The invention and its several methods of the decision whether to use an utterance for adaptation or not will be better understood from the following detailed description of exemplary embodiments thereof taken in conjunction with the appended drawings, wherein:

FIG. 2 shows a first adaptation method according to the present invention in which confidence measures are used to avoid adapting to a misrecognized word and to determine the grade of adaptation. This method is repeatedly executed in an endless loop beginning with step S21.

In said first step S21 the recognition of a user utterance is performed like in a speech recognition system according to the prior art. In the following step S22 a confidence measurement is applied to the recognition result of step S21. In this step confidence measures are used to measure how reliable the recognition result is. In case the confidence measure is smaller than a certain threshold the recognized word is considered as unreliable and will not be used for adaptation so that the adaptation procedure is set forth again with step S21 in which the recognition of the next user utterance is performed. Is the confidence measure, on the other hand, above the threshold, the recognition result is considered to be reliable and used for adaptation in a step S23 before the adaptation procedure is again set forth with step S21 to recognize the next user utterance.

To calculate a confidence measure according to the present invention, first one or several features are extracted from the recognition hypothesis and/or the speech signal. Then a decision is made based on these features whether the phoneme/word/phrase can be classified as correctly or incorrectly recognized. This decision is no hard decision, but a certain probability for the correctness of a received utterance is calculated. The decision is e.g. based on a neural network or on decision trees which take the features as input and compute the confidence measure based upon some internal parameters.

When a neural network is used to calculate the confidence measure, the output, i.e. the confidence measure, is typically a value between 0 and 1; the closer this value is to 1, the more likely the phoneme/word/utterance or sequences thereof was recognized correct. Therefore, a threshold between 0 and 1 gets defined and confidence measures above said threshold classify a recognition result as correct.

The features based on which the confidence measure is computed are extracted from the recognition result or computed directly from the speech signal based on the recognition result. Such features can for example be the (relative) scores of the n-best recognition hypotheses, HMM state durations, durations of the recognized phonemes underlying the recognized words, or segment probabilities. The latter are computed by a stochastic model determining the probability for such a phoneme contained in a word hypothesis given an entire speech segment containing several frames.

The confidence measure can then directly be used to also determine the grade of adaptation. Of course, the simplest case of a confidence measure is to extract only one feature, e.g. the score provided by the HMMs during recognition, and to directly decide if the word was recognized correctly or not based on a threshold. In this case, the grade of adaptation is always constant.

As an alternative to the fixed threshold, the confidence measurement can be used to compute a weight which determines the strength of adaptation performed in step S23.

Furtheron, it is possible to change other parameters the decision is based on during adaptation, e.g. how the threshold used for deciding can be adapted depending on the derived features of the speech signal.

A problem occurs during speaker adaptation of the HMM models, because this influences the features of the confidence measure. This requires either a normalization of the features such that they are invariant to such changes of the HMM models or it requires an automatic on-line adaptation of the features or the parameters of the confidence measure or of the threshold to which the confidence measure is compared. This adaptation is based on a formal algorithm optimizing a criterion like the correctness of the confidence measure. The latter can be estimated based on the user reaction as determined in the vision, interpretation and prosody modules.

Furthermore, the confidence measure cannot only be applied to whole user utterances, but also word-wise or phoneme-wise so that not always the whole utterance is rejected for adaptation, but only the single misrecognized words or the words containing misrecognized phonemes. It is also possible to apply the confidence measures to a speech segment of another arbitrary length.

Such an adaptation guided by confidence measures needs no action from the user, such as announcing to the system that a word was misrecognized. Therefore, this method achieves a considerably better recognition rate for unsupervised or on-line adaptation in automatic speech recognition systems than the systems according to the prior art, since not every user utterance or every word spoken by the user is used for adaptation irrespectively from the fact that such an utterance or word can be misrecognized and the grade of the adaptation depends on the probability of a correct recognized result.

Figure 3:
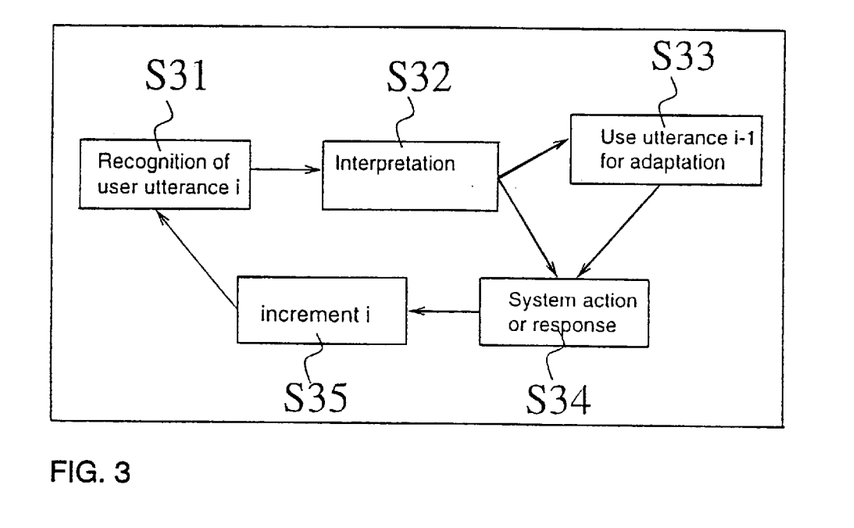
FIG. 3 shows a second adaptation method according to the present invention in which a dialog history is observed.

FIG. 3 shows a second adaptation method according to the present invention in which the dialog history is observed to decide whether an utterance or single word or several words should be used for adaptation or not.

In a dialog system, the reaction of a user often shows if the recognized word was correct or not. A method to judge such a user reaction is shown in FIG. 3. Similar to the method depicted in FIG. 2, this method is repeatedly executed in an endless loop beginning with step S31.

In step S31 a recognition of a user utterance number i is performed like in the systems according to prepare art. Thereafter, the recognition result undergoes an interpretation in step S32 in which will be judged whether the user was satisfied with the systems reaction to his utterance spoken before the utterance number i. As an example such a utterance number i−1 could be "switch on the TV" and for some reasons the system recognized "switch on the radio" and thus the radio was switched on. When the user realizes this mistake, his/her next utterance (i.e. utterance number i) will be something like "no, not the radio, the TV" or "wrong. I said TV". In this case, the system will interpret in step S32 on the basis of utterance number i that the previously recognized utterance was misrecognized and should not be used for adaptation. Step S33 in which the user utterance number i−1 is used for adaptation is in this case left out and step S34 in which the system performs an action or response is not carried out after step S33, but directly after step S32. After the action or response of the system in step S34, i is incremented in step S35 before the next utterance number i+1 of the user is recognized in step S31.

Apart from the wording or interpretation result of an utterance also information about the emotional state of a user, i.e. intonation and/or prosody, can be taken into account to jugde whether the user is satisfied or not in step S32. So by interpreting the utterance using intonation and/or prosody, no special keywords are needed for the system to recognize that a misrecognition of the previously recognized utterance occured. For example, if a user says in an angry way to the system "turn on the TV" after his/her previously spoken utterance was misrecognized, the system can interpret that he/she did not change his/her mind, but that the previously recognized command was misrecognized so that it should not be used for adaptation.

Furtheron, also user reactions observed by a visual computation system, such as a video camera connected to a computer that can interpret the reactions of a user, e.g. the mimic, can be used to verify a recognized utterance, e.g. based on a picture or a video sequence taken from the user and/or the user's face.

In this case it can be determined if the mimic shows anger or astonishment or if the lips of the user were closed although the recognizer recognized some words based on background voices or noise.

Depending on only one or a combination of those user reactions and on the intensity, a grade of adaptation can be determined. As in the case of confidence measures, it is also possible to set a threshold and therewith define a hard decision so that the grade of adaptation is constant.

Figure 4:
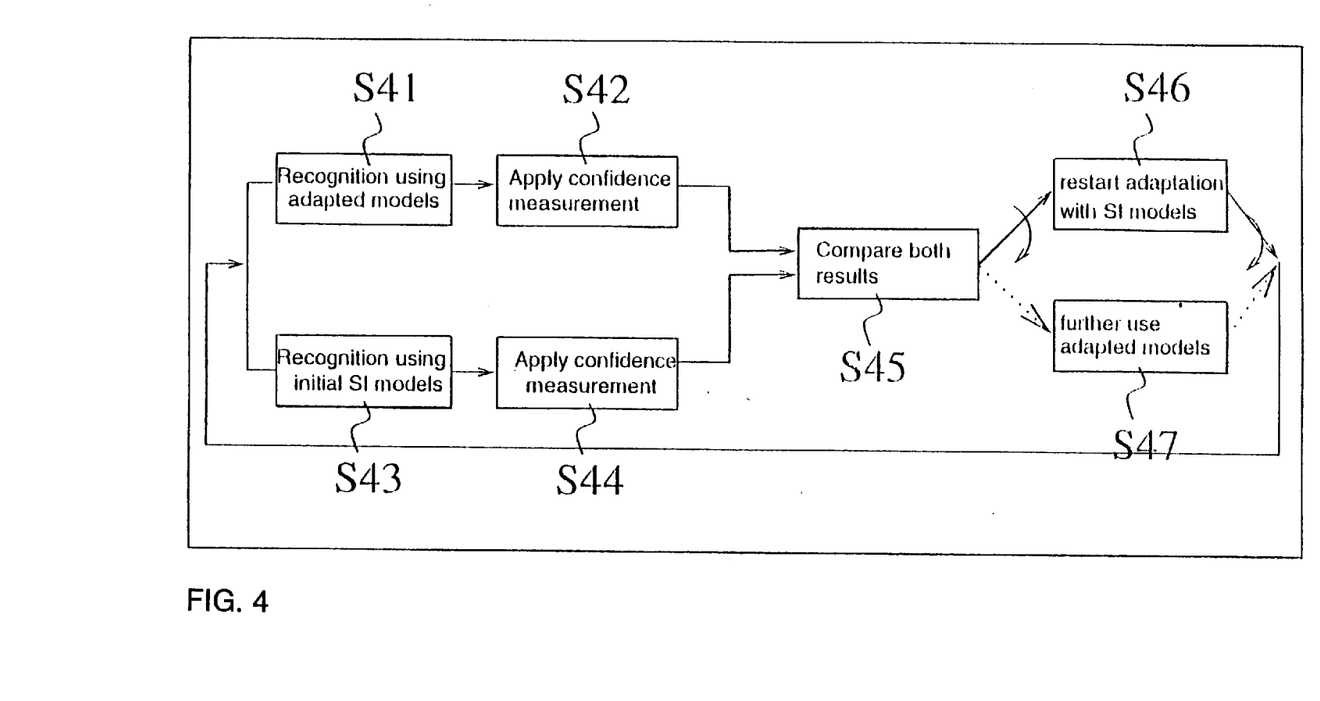
FIG. 4 shows a method of switching back to the initial speaker independent models according to the present invention.

FIG. 4 shows a method according to the present invention, in which the system will switch back to the initial SI models, if the performance of the adapted models is too bad.

In this case, the system recognizes a situation in which adaptation was (repeatedly) done using misrecognized words, or a new speaker uses the system, since then the recognition performance may drop. Therefore, the system will switch back to the original speaker independent models.

Similar to the methods depicted in FIGS. 2 and 3, this method is repeatedly executed in an endless loop beginning with steps S41 and S43 that are executed in parallel.

Therefore, in said step S41 a recognition of a user utterance is performed using the adapted models, while in step S43 a recognition of the same user utterance is performed using the initial speaker independent models. To both recognition results a confidence measurement may be applied, respectively in steps S42 and S44. In a following step S45 both results, e.g. of the confidence measurements, are compared to decide whether to restart the adaptation with the initial speaker independent models in step S46 or to further use and adaptate the adapted models in a step S47, before the parallel recognition performed in steps 41 and 43 is performed with the next user utterance.

This method is not limited to the use of confidence measures to compare said both recognition results. It is also possible that the system uses other user reactions, e.g. of his/her behaviour of a certain time before and/or after the respective utterance or about intonation and/or prosody. It is also thinkable that th system asks the user to decide which models should be used, or which of the recognition results is the correct one and then use the respective model set for further recognition/adaptation.

Therefore, by keeping the original models and comparing their performance to the adapted ones, e.g. after a certain number of adaptation steps or in speech pauses, the initial models are also used by the system and adaptation is restarted in case the recognition result using the speaker independent models and/or the confidence measures indicate that the adapted models do not perform as good as the initial ones. Therewith, it can be assured that the recognition rates never decrease (significantly), but only increase or stay at the same level. By performing this method the user's expectations are exactly satisfied, since a user would expect an automatic speech recognition system to get used to his way of speaking, just like humans do.

It is also possible that the speaker adapted models are not only compared to the speaker independent models to assure a recognition rate never decreasing (significantly), but also or instead to compare the newest speaker adapted models to older speaker adapted models to choose the ones having the best recognition performance and continue adaptation based on them.

Of course, all four methods according to the present invention described above or only a subset of them can be combined to prevent adaptation to misrecognized words or sentences in unsupervised or on-line adaptation mode. With these methods it is controlled whether adaptation is conducted with recognized words or a recognized utterance or not. Additionally a recognition rate never decreasing (significantly) is secured. As mentioned above, the proposed algorithms are independent from the adaptation methods themselves, i.e. they can be combined with any speaker adaptation algorithm.

Figure 1:
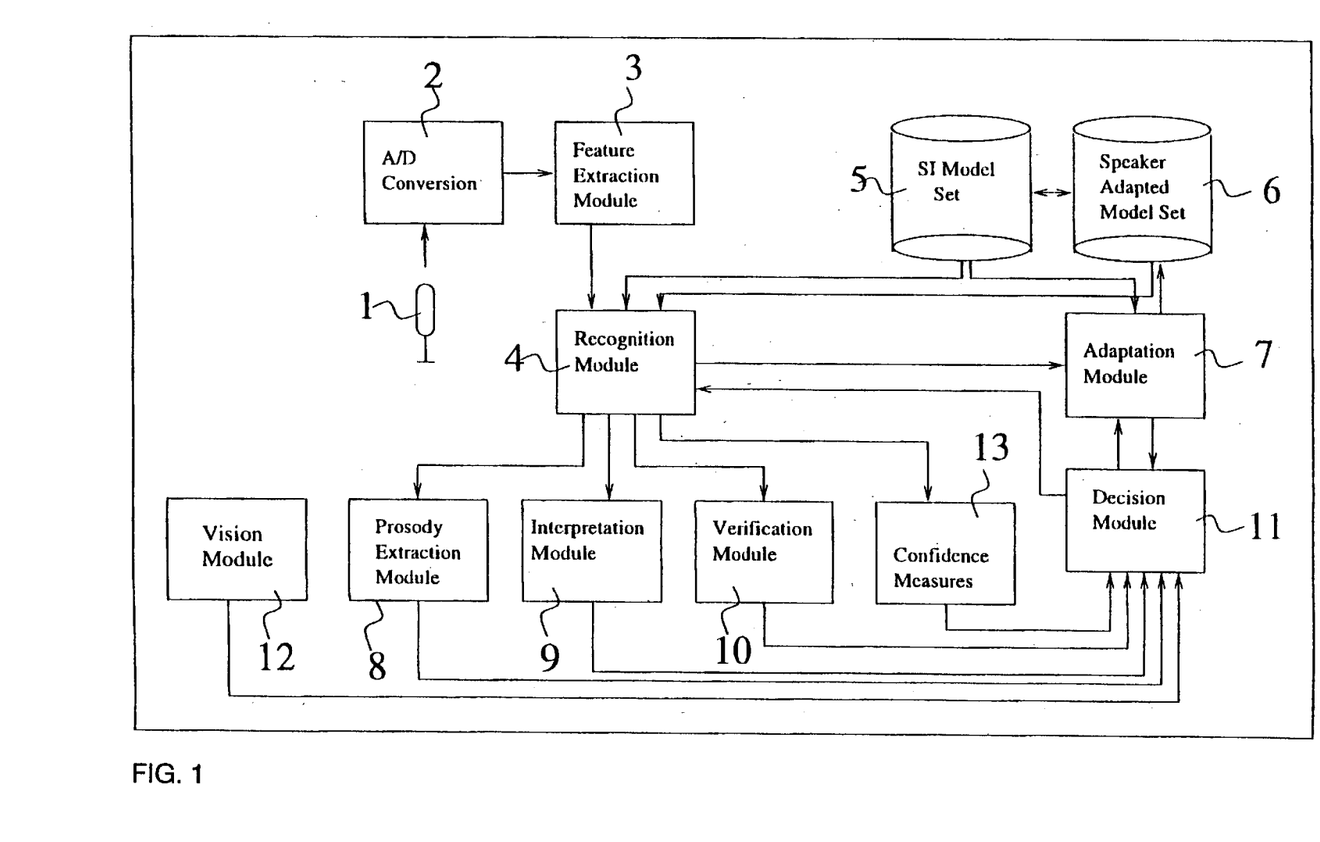
FIG. 1 shows a speech recognition system according to one embodiment of the present invention.

An exemplary embodiment of a recognition system according to the present invention using either one or several of the inventive methods for unsupervised or on-line speaker adaptation is shown in FIG. 1.

In contrast to the speech recognition system according to the prior art shown in FIG. 5 the inventive system shown in FIG. 1 does not comprise a training module like the training module 55 of the prior art system or a similar circuit. This is no limitation of the system according to the present invention, since the training is performed independently of the adaptation with which the present invention is concerned. Of course, a switch provided behind the feature extraction module 3 to switch in-between adaptation/recognition mode and training mode, i.e. to lead the feature vectors either to the recogniton module 4, as it is shown in FIG. 1, or to a not shown training module which in turn can access the set of speaker independent modules that is stored in a storage 5 can also be provided.

FIG. 1 only shows the part of the automatic speech recognition system used for semi-supervised speaker adaptation according to the present invention. Therefore, the analog speech signal generated by a microphone 1 is converted into a digital signal in an A/D conversion stage 2 before a feature extraction is performed by a feature extraction module 3 to obtain a feature vector, e.g. every 10 ms. This feature vector is fed into a recognition module 4 that can access a storage 5 in which a speaker independent model set is stored, a storage 6 in which a speaker adapted model set is stored and an adaption module 7 that uses an adaptation method, e.g. MAP or MLLR, to generate the speaker adapted model set by adaptation of the speaker independent model set. Therefore, the adaptation module 7 can access the speaker independent model set stored in the storage 5 via the storage 6 that is used for storing the speaker adapted model set. So far, all modules or storage devices are used in the same way like in the speech recognition system according to the prior art.

According to the present invention, the recognition module distributes its results furtheron to a prosody extraction module 8 and an interpretation module 9 which perform both methods to decide whether a phoneme, several phonemes, a word, several words or a whole utterance should be used for adaptation or not as described above. Furtheron, the results of the recognition module is distributed to a confidence measure module 13 that calculates the confidence measures as described above. These modules lead their respective results to a decision unit 11 that decides whether adaptation is performed with said phoneme(s) single word, several words or whole utterances to provide its result to the adaptation module 7 which in turn uses this single phoneme(s), word, several words or whole utterance(s) to adapt the speaker adapted model set or not. The decision unit 11 also receives the output of a vision module 12 that represents the users visual behaviour corresponding to a certain utterance, i.e. his visual emotional state, e.g. if his mimic shows anger or astonishment, or if the user said something at all or if the recognized utterance was spoken by someone else.

The decision whether the system should use speaker independent models or speaker adapted models is performed in a verification module 10 that receives both results of the recognition module 4, namely the result based on the speaker adapted model set and the result based on the speaker independent model set. The result of the verification module 10 influences the decision module 11, which passes also a control signal to the recognition module 4 determining which model set to use for the recognition and for the results passed to the prosody extraction module 8, the interpretation module 9 and the confidence measure module 13.

Apart from changing the threshold to decide whether an utterance or part of an utterance should be used for adaptation, the input features of the decision module 11 can be adapted or also the parameters of the decision module 11 can be adapted.

Of course, the decision unit 11 also determines the rate of the reliability of said single phoneme, several phonemes, single word, several words or whole utterance(s) to determine the strength of the adaptation that should be performed in the adaptation module 7. Also, the parameters used within the prosody extraction module 8, the interpretation module 9, the verification module 10 and the confidence measure module 13 can change dynamically as mentioned above. It is also possible that the decision module 11 does not switch immediatly to the speaker independent models, if they perform better, but waits some more utterances before this decision is made.

Therefore, according to the preferred embodiment described above, the decision unit 11 receives the confidence measure (which parameters or features can be adaptive) of the spoken utterance or parts thereof, the information about prosody of the user when speaking the utterance or parts thereof, the interpretation of the user reaction determined on basis of the context of the spoken utterance, the interpretation of the visual user behaviour and the verification of the user to determine the grade of adaptation. Of course the invention is not limited to this and such a decision can also be based on a subset of this information.

What is claimed is:

1. Method to perform an unsupervised and/or on-line adaptation of an automatic speech recognition system, comprising:

receiving an utterance or parts thereof;

determining a recognition result of said received utterance or parts thereof;

determining a grade of the reliability of the recognition result;

determining a grade of adaptation of the system with the help of the received utterance or parts thereof based on the grade of the reliability of the recognition result; and adapting the automatic speech recognition system according to the grade of adaptation;

wherein the grade of adaptation indicates a weight to be applied in adapting the system such that adapting the automatic speech recognition system includes applying an amount of adaptation according to the grade of adaptation, wherein said received utterance or a part of said received utterance is used for adaptation when the grade of the reliability of the recognition is above a threshold and is discarded when it is below said threshold, and wherein said threshold is dynamically changeable.

2. Method according to claim 1, characterized in that the grade of the reliability of the recognition result of said received utterance or a part of said received utterance is measured on the basis of confidence measures.

3. Method according to claim 2, characterized in that parameters and/or features said confidence measures are based on are adaptive.

4. Method according to claim 2, characterized in that said confidence measures are calculated on an utterance, word or phoneme based confidence score for each received utterance or part of said utterance.

5. Method according to claim 4, characterized in that said confidence score determines said grade of the reliability of the recognition result of said received utterance or a part of said received utterance.

6. Method according to claim 1, characterized in that the grade of the reliability of the recognition result of said received utterance or a part of said received utterance is measured on the basis of reactions of the speaker of said utterance.

7. Method according to claim 6, characterized in that said reactions are determined via a visual computation system based on a picture or video sequence taken from the user and/or the user's face.

8. Method according to claim 6, characterized in that the grade of the reliability of the recognition result of said received utterance or a part of said received utterance is measured on the basis of confidence measures, and said confidence measures depend on the emotional state of the person speaking said utterance.

9. Method according to claim 8, characterized in that said reactions are determined by interpretation of secondary information of utterances or parts of utterances received after said received utterance or parts of said received utterance.

10. Method according to claim 9, characterized in that said secondary information of utterances or parts of utterances received after said received utterance or parts of said received utterance is intonation and/or prosody of said utterances or parts of utterances received after said received utterance or parts of said received utterance.

11. Method according to claim 6, characterized in that said reactions are determined by recognition and interpretation of utterances or parts of utterances received after said received utterance or parts of said received utterance.

12. Method according to claim 11, characterized in that said utterances or parts of utterances received after said received utterance or parts of said received utterance are checked for predefined keywords indicating that a previously received utterance was incorrectly or correctly recognized.

13. Method to perform an unsupervised or on-line adaptation of an automatic speech recognition system, comprising:
    performing adaptation of the system with the help of a received utterance of parts thereof by repeatedly adapting a set of parameters; and
    storing at least one set of earlier parameters to replace the currently used parameters in case the recognition performance of the system drops;
    wherein the recognition performance of the system is judged on the basis of the method defined in claim 1.

14. Method according to claim 1, characterized in that the adaptation of the system is performed using the adaptation of Hidden Markov Models.

15. Method according to claim 14, further comprising adapting a speaker independent Hidden Markov Model towards the performance of a speaker dependent Hidden Markov Model by adjusting parameters of the speaker independent Hidden Markov Model.

16. Method to perform an unsupervised or on-line adaptation of an automatic speech recognition system, comprising:
    performing adaptation of the system with the help of a received utterance or parts thereof by repeatedly adapting a set of parameters; and
    storing at least one set of earlier parameters to replace the currently used parameters in case the recognition performance of the system drops;
    wherein adapting the automatic speech recognition system includes determining a recognition result of a received utterance or parts thereof, determining a grade of the reliability of the recognition result, determining a grade of adaptation of the system with the help of the received utterance or parts thereof based on the grade of the reliability of the recognition result, and applying an amount of adaptation according to the grade of adaptation,
    wherein said received utterance or a part of said received utterance is used for adaptation when the grade of the reliability of the recognition is above a threshold and is discarded when it is below said threshold, and
    wherein said threshold is dynamically changeable.

17. Method according to claim 16, characterized in that the initial set of parameters is stored.

18. Method according to claim 16, characterized in that the recognition performance of the system is judged by comparing actual recognition results on the basis of stored earlier parameters and on the basis of the newest adapted parameters.

19. Speech recognition system with unsupervised and/or on-line adaptation, comprising:
    a microphone (1) to receive spoken words of a user and to output an analog signal;
    an A/D conversion stage (2) connected to said microphone (1) to convert said analog signal into a digital signal;
    a feature extraction module (3) connected to said A/D conversion stage (2) to extract feature vectors of said received words of the user from said digital signal;
    a recognition module (4) connected to said feature extraction module (3) to recognize said received words of the user on basis of said feature vectors and a set of speaker independent and/or speaker adapted models;
    an adaptation module (7) receiving the recognition result from said recognition module (4) to generate and/or adapt said speaker adapted model set;
    wherein a decision unit (11) that is connected to said recognition module (4) and that supplies a signal to said adaptation module (7) indicating whether to use a certain received word for generation and/or adaptation of the speaker adapted model set or not;
    wherein said signal supplied to said adaptation module (7) from said decision unit (11) indicates a weight to be applied as the strength of adaptation of the speaker adapted model set by said adaptation module (7) on the basis of said certain received words;
    wherein said decision unit (11) determines a grade of reliability for said certain received word and said certain received word is used for adaptation when the grade of the reliability of the recognition is above a threshold and is discarded when it is below said threshold; and
    wherein said threshold is dynamically changeable.

20. Speech recognition system according to claim 19, characterized in that said signal supplied to said adaptation module (7) from said decision unit (11) is created on basis of a first control signal generated by a prosody extraction module (8) connected in-between said recognition module (4) and said decision unit (11).

21. Speech recognition system according to claim 19, characterized in that said signal supplied to said adaptation module (7) from said decision unit (11) is created on basis of a second control signal generated by a interpretation module (9) connected in-between said recognition module (4) and said decision unit (11).

22. Speech recognition system according to claim 19, characterized in that said signal supplied to said adaptation module (7) from said decision unit (11) is created on basis of a third control signal generated by a verification module (10) connected in-between said recognition module (4) and said decision unit (11).

23. Speech recognition system according to claim 19, characterized in that said signal supplied to said adaptation module (7) from said decision unit (11) is created on basis of a fourth control signal generated by a confidence measures module (12) connected in-between said recognition module (4) and said decision unit (11).

24. Speech recognition system according to claim 19, characterized in that said signal supplied to said adaptation module (7) from said decision unit (11) is created on basis of a fifth control signal generated by a vision module (12) connected to said decision unit (11).

25. Method to perform an unsupervised and/or on-line adaptation of an automatic speech recognition system, comprising:

receiving an utterance or parts thereof;
determining a recognition result of said received utterance or parts thereof;
determining a grade of the reliability of the recognition result;
determining a grade of adaptation of the system with the help of the received utterance or parts thereof based on the grade of the reliability of the recognition result; and
adapting the automatic speech recognition system according to the grade of adaptation;
wherein the grade of adaptation indicates a weight to be applied in adapting the system such that adapting the automatic speech recognition system includes applying an amount of adaptation according to the grade of adaptation,
wherein the grade of the reliability of the recognition result of said received utterance or a part of said received utterance is measured on the basis of reactions of the speaker of said utterance, and
wherein said reactions are determined via a visual computation system based on a picture or video sequence taken from the user and/or the user's face.

26. Method to perform an unsupervised and/or on-line adaptation of an automatic speech recognition system, comprising:

receiving an utterance or parts thereof;
determining a recognition result of said received utterance or parts thereof;
determining a grade of the reliability of the recognition result;
determining a grade of adaptation of the system with the help of the received utterance or parts thereof based on the grade of the reliability of the recognition result; and
adapting the automatic speech recognition system according to the grade of adaptation;
wherein the grade of adaptation indicates a weight to be applied in adapting the system such that adapting the automatic speech recognition system includes applying an amount of adaptation according to the grade of adaptation,
wherein the grade of the reliability of the recognition result of said received utterance or a part of said received utterance is measured on the basis of reactions of the speaker of said utterance, and
wherein the grade of the reliability of the recognition result of said received utterance or a part of said received utterance is measured on the basis of confidence measures, and said confidence measures depend on the emotional state of the person speaking said utterance.

27. Method according to claim 2, characterized in that said reactions are determined by interpretation of secondary information of utterances or parts of utterances received after said received utterance or parts of said received utterance.

28. Method according to claim 27, characterized in that said secondary information of utterances or parts of utterances received after said received utterance or parts of said received utterance is intonation and/or prosody of said utterances or parts of utterances received after said received utterance or parts of said received utterance.

29. Speech recognition system with unsupervised and/or on-line adaptation, comprising:

a microphone to receive spoken words of a user and to output an analog signal;
an A/D conversion stage connected to said microphone to convert said analog signal into a digital signal;
a feature extraction module connected to said A/D conversion stage to extract feature vectors of said received words of the user from said digital signal;
a recognition module connected to said feature extraction module to recognize said received words of the user on basis of said feature vectors and a set of speaker independent and/or speaker adapted models;
an adaptation module receiving the recognition result from said recognition module to generate and/or adapt said speaker adapted model set;
wherein a decision unit that is connected to said recognition module and that supplies a signal to said adaptation module indicating whether to use a certain received word for generation and/or adaptation of the speaker adapted model set or not,
wherein said signal supplied to said adaptation module from said decision unit indicates a weight to be applied as the strength of adaptation of the speaker adapted model set by said adaptation module on the basis of said certain received words, and
wherein said signal supplied to said adaptation module from said decision unit is created on basis of a first control signal generated by a prosody extraction module connected in-between said recognition module and said decision unit.

30. Speech recognition system with unsupervised and/or on-line adaptation, comprising:

a microphone to receive spoken words of a user and to output an analog signal;
an A/D conversion stage connected to said microphone to convert said analog signal into a digital signal;
a feature extraction module connected to said A/D conversion stage to extract feature vectors of said received words of the user from said digital signal;
a recognition module connected to said feature extraction module to recognize said received words of the user on basis of said feature vectors and a set of speaker independent and/or speaker adapted models;
an adaptation module receiving the recognition result from said recognition module to generate and/or adapt said speaker adapted model set;
wherein a decision unit that is connected to said recognition module and that supplies a signal to said adaptation module indicating whether to use a certain received word for generation and/or adaptation of the speaker adapted model set or not,
wherein said signal supplied to said adaptation module from said decision unit indicates a weight to be applied as the strength of adaptation of the speaker adapted model set by said adaptation module on the basis of said certain received words, and
wherein said signal supplied to said adaptation module from said decision unit is created on basis of a fifth control signal generated by a vision module connected to said decision unit.

* * * * *